Patented Sept. 20, 1932

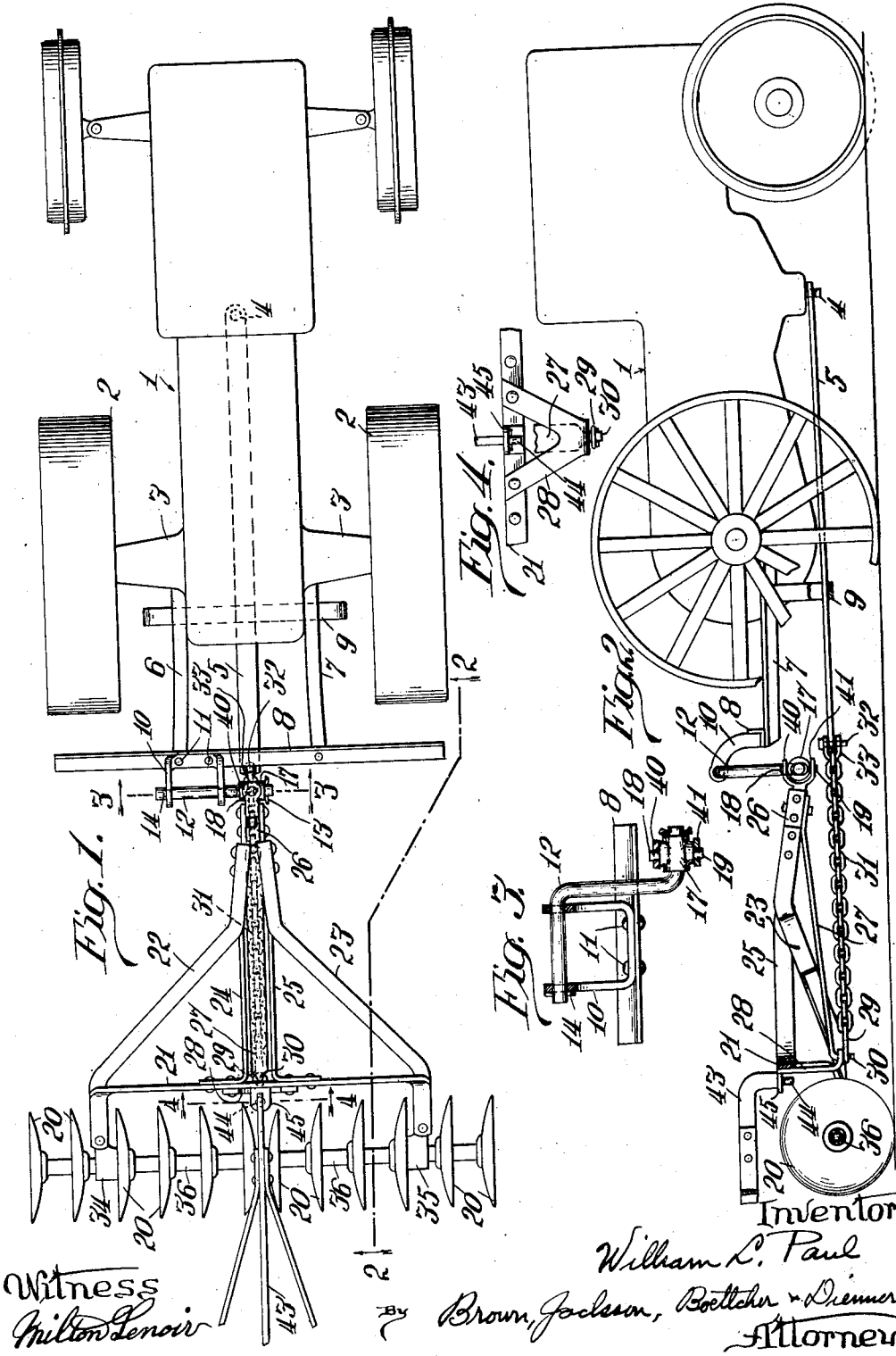

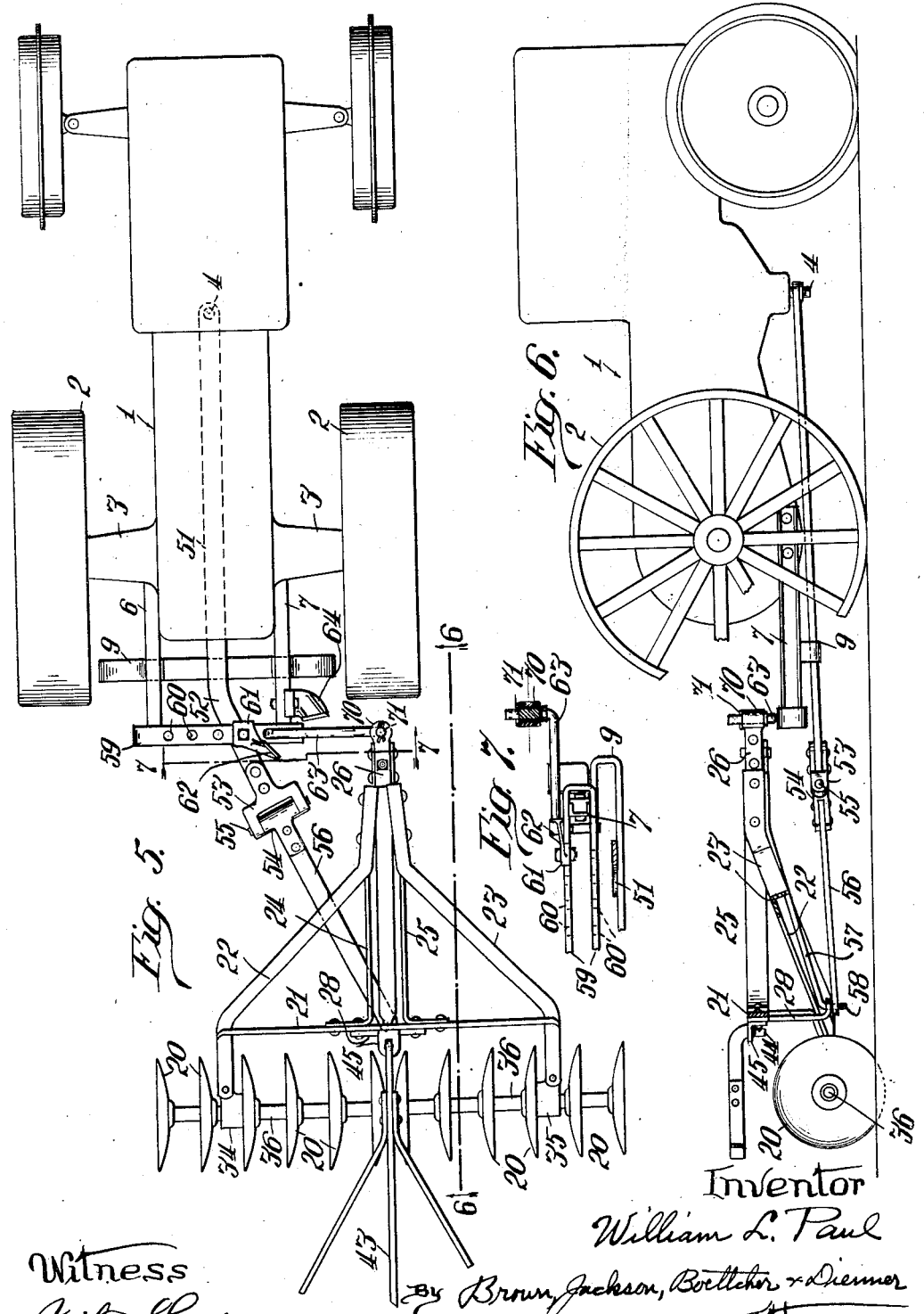

1,877,958

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

DISK HARROW

Application filed July 29, 1929. Serial No. 382,026.

This invention relates to disk harrows and has for its principal object the provision of a new and improved draft connection for attaching the harrow to a tractor.

A disk harrow containing an axle upon which the disks are mounted and a tongue or framework attached to the axle and leading forward from the harrow, may be attached to the fixed draw bar at the rear of a tractor. When a harrow is so attached to the tractor it will follow the tractor in turning without cutting corners, that is the harrow will follow closely in its line of travel relatively to the tractor and will not crowd in towards the inside edge of the turn as the tractor is being turned.

However, it is a fact that a harrow so hitched on to a tractor has tendency to resist the turning of the tractor; that is, with the harrow attached to a fixed point rearwardly on the tractor and rotatable about that point, extra effort must be exerted on the harrow by the tractor in order to make a turn. The point of attachment of the harrow to the tractor must be a certain distance in back of the rear wheels in order for the harrow to accurately trail the tractor, and if the point is shifted forward the harrow begins to cut corners while the resistance to turning decreases. The extra resistance to turning is objectionable for the reason that in turning the traction of the driving wheels is unequal and, therefore, the driving wheels have a tendency to mire down in the soft dirt, which tendency is accelerated by the resistance to turning afforded by the harrow. Moreover, the front wheels of the tractor have a tendency to slip sideways when the tractor is being turned, and the resistance to turning afforded by the harrow, augments this tendency.

The tongue of the harrow may also be attached to a pivoted drawbar on the tractor, that is to a drawbar which in itself is free to move from side to side on the tractor within a limited arc defined by the frame of the tractor. A harrow so connected to the tractor does not have any tendency to resist the turning of the tractor, but however, it does have a tendency to cut corners when the tractor is being turned.

Obviously, since the drawbar of the tractor is pivoted it will be pulled towards the inside edge of the turn, and the harrow following behind this drawbar and being pivotally connected to the drawbar will move still further towards the inside edge of the turn.

As a result of this operation the path followed by the harrow in moving around the field is a round cornered path, and the corners of the field, therefore, are not cultivated by the harrow.

In my present invention I have provided a new and improved draft connection for attaching a disk harrow and other similar farm implement to a tractor, a connection which causes the harrow to accurately follow the tractor in turning and which does not increase the tendency of the harrow to resist turning.

In many instances it is necessary to connect the harrow to the tractor in an offset position, that is to project the harrow beyond one side or the other of the tractor. For example, in the cultivation of an orchard, it is necessary to offset the harrows so that they may reach under the branches of the trees and cultivate the ground adjacent to the trunks of the trees while the tractor is being driven between the rows of trees and at some distance from those rows. When a harrow, or any other cultivating device, is hitched to a tractor in an offset position, it imposes an appreciable side draft upon the tractor, which side draft tends to pull the tractor over in line with the harrow and, consequently, makes steering of the tractor more difficult.

Moreover, the amount of side draft imposed upon the tractor by the implement so connected to it, increases with the angle of the line of draft between the implement and the tractor with respect to the line of advance of the tractor. That is, the draft between the implement and the tractor is composed of two components, one in the direction of motion of the tractor and one at right angles thereto, and obviously if the offset is great the latter component will be correspondingly increased.

When an implement, such as a disk harrow, is attached to a tractor in offset position, the side draft increases very appreciably when the tractor is being turned in the opposite direction to the offset, and in many instances this side draft increases to such an extent that turning in the opposite direction to the offset is a very difficult matter.

It will be apparent to those skilled in the art that the side draft imposed upon the tractor by an implement connected to the tractor in an offset position will be lessened by the use of a relatively long draft bar on the tractor, that is by hitching the implement at some distance behind the tractor. However, with an implement so connected to the tractor the tendency for the implement to cut corners when a turn is being made is greatly increased, and a connection of this type is therefore objectionable.

The draft connection of my present invention has the further advantage that it reduces the amount of side draft imposed upon the tractor by an offset connection of an implement to the tractor without increasing the tendency of the implement to cut corners or increasing the tendency of the implement to resist turning of the tractor. Conversely with a given amount of allowable side draft, the use of my improved draft connection permits hitching the implement to the tractor with a larger degree of offset, thereby increasing the field of usefulness of the implement and tractor.

To acquaint those skilled in the art with the teachings of my invention I have illustrated a preferred embodiment of it in the accompanying drawings in which:

Figure 1 is a plan view of the front gang of a two gang disk harrow hitched to a tractor in accordance with my invention, Figure 2 is a sectional view of the tractor and harrow taken substantially along the line 2—2 of Figure 1, Figure 3 is an enlarged cross sectional view taken along the line 3—3 of Figure 1, Figure 4 is a detail of the draft connecting member of the disk harrow taken along the line 4—4 of Figure 1;

Figure 5 is a plan view of a harrow attached to a tractor in offset position by another form of my invention;

Figure 6 is a sectional view taken along the line 6—6 of Figure 5, and

Figure 7 is a cross sectional view taken along the line 7—7 of Figure 5.

Referring to Figures 1 to 4 inclusive, in more detail, it will be seen that the tractor 1 is provided with a rear axle 3 which supports driving wheels 2. The tractor 1, which may be any preferred form of commercial tractor is not of the essence of the present invention and is only diagrammatically illustrated.

A frame, comprising members 6 and 7 which are attached to opposite sides of the body of the tractor 1 at a point adjacent to and beneath the driving axle 3, is projected rearward from the tractor and terminated in a cross member 8. Preferably the members 6, 7 and 8 are angle irons of suitable dimension, riveted together and attached to the tractor body by bolts.

A drawbar supporting bracket 9 is riveted to the channel support members 6 and 7 at a point immediately behind the driving axle 3 of the tractor. This drawbar support member 9 is U-shaped and extends downward from the frame members 6 and 7 to a point below the body of the tractor.

A second U-shaped member 10 is secured to the cross frame member 8 and projected upward and rearwardly therefrom, to serve as a support for a steering bar 12.

The steering bar 12, which is substantially Z-shaped, is pivotally supported in suitable openings at the upper end of the U-bracket 10, being held therein by a cotter pin 14 projected through the steering bar 12 on the outside of the bracket 10.

The steering bar 12 projects vertically downward from its horizontal pivot connection with the bracket 10, and terminates in a horizontal portion disposed beneath the frame members 6 and 7 and somewhat above and to the rear of the drawbar support member 9.

The drawbar 5 rests in the drawbar support frame 9 and is pivoted to the body of the tractor by the pivot 4 which is located forward of the driving axle 3 of the tractor. The pivot point 4, is preferably located with respect to the front and rear axles of the tractor so that the drawbar pivoted to it neither aids nor resists turning of the tractor. It is well known to those skilled in the art that if a drawbar is pivoted too near the front axle of the tractor, it has a tendency to force steering of the tractor. The balanced location of the pivot point 4, where draft neither aids nor resists turning of the tractor, is preferable, although this point may be disposed either forwardly or backwardly of such location as desired. The point 4 should, however, be disposed considerably farther forward than is the case in ordinary commercial tractors having pivoted drawbars to materially reduce the resistance of the harrow to turning.

The draw bar 5 is an iron or steel bar of generally rectangular cross section, is perforated at both ends, and fitted over the steel pivot pin 4 at its front end, being held thereon by a cotter pin, not shown, projected through the pivot pin 4. The rear end hole in the draft bar 5 serves as an opening through which the king pin that connects the draft member to the implement can be inserted.

The implement illustrated as a disk harrow is shown by way of example only, as any similar implement can be attached to a tractor by the draft connection of my invention. The harrow comprises the axle 36 upon which the disks 20 are mounted and upon which the bearings 34 and 35 are positioned between adjacent disks. The tongue, or frame, of the harrow comprises the cross member 21 which is attached to the bearings 34 and 35 and projected forward and upward from the axle.

A pair of frame members 24 and 25 are riveted to this cross frame member 21 at points equally displaced from the center of the cross member, these frame members 24 and 25 projecting forward from the cross member. Preferably the cross member 21 and frame members 24 and 25 are steel bars of rectangular cross section and of suitable size to have the strength required of them.

A pair of angle brace members 22 and 23 are attached to the cross member 21 at points adjacent to the connection of that cross member to the bearings 34 and 35. These brace members extend upward and inward and are riveted to the frame members 24 and 25 at the front ends of these members at a point adjacent to a connecting block 26 which is riveted to the forward ends of the members 24 and 25.

As will be best seen in Figure 4 a V-shaped member 28 is riveted to the cross member 21 and projects downward with the point of the V located substantially at the center of the harrow. The lower end of this V member 28 is bent forward at right angles to the member, as will be best seen in Figure 2. An additional bracing bar 27 is bolted or riveted to the connecting block 26 of the forward end of the tongue, and projected downward and backward to the V brace 28. The brace 27 is provided with a tongue or pin 30 at its rear end which pin fits down through an opening in the angle portion of the brace 28.

A draft connecting link 29 is fitted over the end 30 of the brace member 27 and the assembly is locked on to the angle portion of the brace 28 by a cotter pin projected through the end portion of the member 30 below the draft link 29.

An angular bracket 45 is riveted or welded to the cross member 21 of the disk harrow on the center line of that cross member and serves as a connecting means for permitting the attachment of another harrow unit to the harrow unit shown. The tongue 43, of the second harrow unit, not shown, is provided with a rounded tenon 44 which projects through an opening in the bracket 45 and is locked therein by a cotter pin beneath the bracket.

This pivotal connection of the tongue 43 of the second harrow unit to the bracket 45 of the first unit serves both as a steering and as a draft connection for the second unit.

The tongue of the first unit is connected to the tractor by a connecting swivel attached to the connecting block 26. This connecting swivel comprises the collar 17 which is mounted upon the horizontal portion of the steering rod 12 and held thereon by a cotter pin 13. The block 17 is provided with oppositely disposed pintles 18 and 19 which are projected out of the flat top and bottom faces of the block. A pair of perforated arms 40 and 41 are attached to the connecting block 26 and fitted on opposite faces of the swivel block 17 with the pintles 18 and 19 projecting through the perforations in these fork arms.

The swivel block 17 is rotatable around a horizontal axis and the arms 40 and 41 are rotatable about a vertical axis so that this swivel connection between the tongue of the disk harrow and the steering bar 12 of the tractor is in effect a universal joint capable of being flexed in all four directions.

To complete the connection of the harrow to the tractor a draft bar or chain 31 is connected to the draft link 29 on the harrow and to the rear end of the draw bar 5, this rear end connection being made by a clevis 33 and clevis pin 32.

It will be apparent that the tongue connection through the steering rod 12 is not capable of pulling the harrow. The steering bar 12 is rotatable about the horizontal axis disposed at its upper end, and swings in a backward direction as the tractor moves forward until the draft chain 31 becomes taut.

The tractive force of the tractor is transmitted to the disk harrow by the draw bar and draft chain 31 and the swivel connection of the tongue to the tractor is for steering purposes and for backing.

When the tractor is being turned the arms 40 and 41 pivot about the pintles 18 and 19 as the tractor is turned with respect to the harrow. The draw bar 5 slides in its guide 9 and rotates about the pivot 4 to pull the disk harrow along.

In operation, when the tractor is being turned, the implement lags back until its transverse axis intersects the center of the circle transcribed by the tractor. This lagging back is permitted by the pivotal mounting of the steering bar 12, which permits a limited fore and aft movement of the swiveled tongue connection. The chain 31 remains taut and continues to transmit draft force to the implement. Since the draw bar 5 is pivoted ahead of the traction wheels of the tractor the draft force offers no resistance to turning and since the steering connection of the implement is supported at a point to the rear of the traction wheels the implement will follow the tractor in turning.

Thus it will be seen that the draft connection of my invention possesses the advantage of accurate following of the tractor by the implement by connecting the tongue of the implement to a point that is fixed against lateral movement with respect to the tractor, and that it combines the advantage of a laterally movable draw bar therewith. The pivoting of the implement to a fixed point on the tractor insures that it will follow the tractor accurately. The pivotal draw bar insures that the implement will be pulled around corners without adding to the tractive effort required to pull the harrow and, therefore, can be turned without any tendency to resist the steering.

The pivotable mounting of the steering rod 12 permits longitudinal positioning of the harrow with respect to the tractor over a sufficient range or variation to insure that the draw bar 5 and chain member 31 will be tight even when the tractor and disk harrow are being turned in the field.

If it becomes necessary to back the tractor and harrow, the steering bar 12 moves in a counterclockwise direction, as seen in Figure 2, and butts against the cross member 8 of the tractor frame work, in which position its rotation relative to the framework is stopped and the disk harrow is pushed through the bar 12 and the tongue of the harrow connected thereto.

Obviously, it is not necessary that the draft member 31 be a chain as shown, as a solid draw bar similar to the draw bar 5 or any other preferred form of draft member might be substituted for the chain.

The straight line hitch of the harrow to the tractor, shown in Figure 1, may be modified and the harrow hitched in an offset position by moving the bracket 10 on the frame member 8. When the harrow is so connected, the draft chain 31 is preferably replaced by a rigid draft bar, bent in the direction of the offset.

In Figures 5 to 7 inclusive I have shown an embodiment of my invention adapted to permit the implement, such as a disk harrow, to track in an offset position behind the tractor.

The tractor 1 is provided with the frame members 6 and 7 as before, and with the cross member 59 which is provided with a plurality of bolt holes 60. As will be seen in Figure 7 the cross member 59 is in reality a pair of cross members one disposed above and one below the frame members 6 and 7. Preferably, in this adaptation of the invention the frame members 6 and 7 are channel irons and as such afford a flat surface on both their upper and lower faces to which the cross member 59 is attached.

A steering bar 63 projects through a hole in the upper plate of the cross member 59 and a hole in the lower plate of the cross member 59 registering therewith. The steering bar 63 is of a general Z-shaped construction and is pivoted about a vertical axis extending through that portion of the bar which extends through the holes in the cross plate member.

The horizontal portion of the bar 63 extends outward from the frame of the tractor and terminates in a vertical portion which is disposed in juxtaposition to the driving wheel 2 of the tractor. Obviously the length of the steering rod 63 and its position on the frame of the tractor will govern the amount of offset of the implement with respect to the tractor.

A draw bar supporting member 9 is attached to the frame members 6 and 7 and disposed beneath and to the rear of the driving axle 3 of the tractor as before. The draw bar 51 is pivoted to the bottom side of the body of the tractor at the pivot point 4, and rests in this draw bar supporting rack 9, being slidable therein and rotatable about the pivot point 4. Preferably the draw bar 51 is bent at the point 52 immediately to the rear of the supporting member 9, and the rearward end of the bar extended in the direction of the offset of the implement. This bend permits making turns of equal amounts in either direction without the draw bar striking on either traction wheel of the tractor.

The end of the drawbar 51 is equipped with the hinge member 53 and king bolt 55 into which the hinge member 54 of the draft bar 56 is fitted and held as will be subsequently explained.

The disk harrow is provided with the usual tongue terminating in the connecting block 26 from which the eye 70 projects and fits over the vertical portion of the steering rod 63, being held thereon by the cotter pin 71 projecting through a hole in the rod. The eye 70 has its inner surface rounded from each end, as in Figure 7. This provides a desirable looseness in this connection to accommodate rocking movement of the harrow vertically in its passage over the ground.

The draft member 56 is attached to the rearward end of the brace 57 and held thereon by a cotter pin 58 extending through this brace.

The hinged connection between the draft member 56 and the draw bar 51 of the tractor permits movement of the draft member in a vertical plane about a horizontal axis through the king pin 55. The hinged member also resists a lateral movement of the draft member 56 with respect to the draw bar 51. This flexibility permits movement of the tractor with respect to the implement as the tractor is being driven over uneven ground.

The steering rod 63 on the tractor is rotatable about a vertical axis and by this rotation the distance between the tractor and the implement is variable over a limited range so that the implement will be drawn by the draw bar 51 and draft member 56 rather than by the steering connection through the tongue. To limit the amount of movement that the steering member 63 can make, I provide stop blocks 62 and 64 which are bolted to the framework of the tractor and which serve to limit the movement of the bar 63 with respect to said frame in an obvious manner.

As the tractor is being turned to the left, referring to Figure 5, the steering rod member 63 rotates about its vertical axis in a clockwise direction, moving the outer end of said rod member to the rear.

The draw bar moves in a clockwise direction about the pivot 4, the hinged member and the rear end of the draw bar swinging toward the left end of the supporting frame 9.

In practice, the steering rod 63 does not actually strike the stop blocks 62 and 64, when the tractor is being turned, but rather the movement of the tractor with respect to the harrow is limited by the draw bar 52 striking the ends of the support 9. As the harrow swings with respect to the tractor from a straight forward position, to the right as the tractor is being turned to the right, the steering rod 63 moves in a counter-clockwise direction to a position very close to the stop block 64, and then begins to rotate in a clockwise direction until the draw bar 52 strikes the right end of the support 9. When a turn to the left is being made, the steering rod 63 turns in a clockwise direction until it nearly touches stop block 62, at which point the draw bar strikes the left end of the support 9 and further rotation of the steering rod is thereby prevented.

If the load on the harrow becomes unbalanced and tends to twist the harrow in either direction, the steering bar 63 strikes one or the other of the stop blocks and thereby prevents further turning of the harrow. When the implement is to be backed the rod 63 strikes the stop 64, because in such case all of the play in the connections and spring in the parts acts in the opposite direction so that the rod 63 is rotated counter-clockwise to where it strikes the stop 64.

The draft or pull to the implement is thereby transmitted to the implement through the draw bar connections rather than through the steering tongue connection and the advantage of the long draw bar and consequent elimination of the tendency to resist turning is achieved.

The pivotal coupling of the tongue of the implement to a certain rearwardly and relatively fixed point on the tractor results in the accurate following of the tractor by the implement, and the consequent elimination of the tendency of the implement to cut corners during turning. The amount of offset can be adjusted by inserting the pivot portion of the steering bar 63 into the proper one of the holes 60.

Since the long draw bar is used to pull the implement after the tractor, the side draft put on the tractor by the offset connection of the implement is thereby reduced, or conversely if a given amount of side draft is to be tolerated a greater offset of the implement with respect to the tractor can be achieved and the usefulness of the combination thereby increased.

From the foregoing it will be apparent that I have devised a new and improved draft connection for attaching farming implements to the rear of a tractor, a connection which causes the implement to accurately follow the path of the tractor without any material tendency to resist the turning movement of the tractor, and furthermore that the connection reduces the amount of side draft placed on the tractor by an offset connection of the implement to the tractor.

While I have chosen to show my invention in connection with a draft connection for attaching a disk harrow to a tractor, I have done so by way of example only as the invention can be applied to draft connections for other similar implements.

I am not, therefore, to be limited to the specific disclosure which has been made by way of example only.

Having thus complied with the statutes and shown and described the preferred embodiment of my invention, what I consider new and desire to have protected by Letters Patent is pointed out in the appended claims.

What is claimed is:

1. A draft connection for attaching an implement to a tractor in such a manner that the implement will follow the tractor in turning without material resistance to that turning, comprising a tongue on the implement, a steering bar on and capable of motion fore and aft of the tractor to which said tongue is attached to steer the implement, and a draft bar pivoted to the tractor ahead of the steering bar and connected to said tongue at a point adjacent to the implement.

2. A draft connection for attaching an implement to a tractor in such a manner that the implement will follow the tractor during turning without material resistance to that turning, comprising a tongue on the implement, a steering bar pivoted on and capable of limited motion fore and aft of said tractor and connected at its free end to said tongue, said connection being capable of limited motion fore and aft of said tractor, and a draw bar pivoted to said tractor ahead of said steering bar and connected to said tongue at a point adjacent to said implement.

3. A draft connection for attaching an implement to a tractor in such a manner that the implement will follow the tractor in turning without material resistance to that turning, comprising a tongue on the implement, a steering bar connected to said tractor and having a free end offset from the center line of the tractor, a connection between said tongue and said free end of the steering bar, a draw bar pivoted to said tractor on the center line of the tractor and bent towards said tongue connection at the proximate plane of said connection, and a connection between said draw bar and a point on said tongue adjacent to said implement.

4. A draft connection for attaching an implement to a tractor in such a manner that the implement will follow the tractor in turning without material resistance to that turning, comprising a tongue on the implement, a steering bar connected to said tractor and having a free end offset from the center line of the tractor, a connection between said tongue and the free end of said steering bar, a draw bar pivoted to said tractor on the center line of the tractor and bent towards said tongue connection at the proximate plane of said connection, a connecting member hinged to said draw bar for limited rotation in a vertical plane and held against movement with respect to said draw bar in a horizontal plane, and a connection between the rear end of said connecting member and said tongue at a point adjacent to said implement.

5. A draft connection for attaching an implement to a tractor in such a manner that the implement will follow the tractor during turning without material resistance to that turning, comprising a tongue on the implement, a steering bar connected to said tractor and having a free end offset from the center line of the tractor and capable of limited rotation about a vertical axis on the tractor, a connection between said tongue and the free end of said steering bar, a draw bar pivoted to said tractor on the center line of the tractor and bent towards said tongue connection at the proximate plane of said connection, and a connection between said draw bar and a point on said tongue adjacent to said implement.

6. A draft connection for attaching an implement to a tractor in such a manner that the implement will follow the tractor in turning without material resistance to that turning, comprising a tongue on the implement, a frame on the tractor extending rearwardly from the driving wheels, a steering rod pivoted to said frame to permit rotation of the rod through a horizontal plane, said rod having its free end disposed adjacent to one of said driving wheels, a connection between said free end of said rod and said tongue, said connection permitting rotation of the tongue about a vertical axis and serving to steer the implement and means other than said tongue connection for causing said tractor to pull the implement.

7. A draft connection for attaching a disk harrow to a tractor in such a manner that the harrow will follow the tractor in turning without material resistance to that turning, comprising a tongue on the harrow, a frame on the tractor extending rearwardly from the driving wheels, a steering rod pivoted to said frame to permit rotation of the rod through a horizontal plane, said rod having its free end disposed adjacent to one of said driving wheels, a connection between said free end of said rod and said tongue, said connection permitting rotation of the tongue about a vertical axis and serving to steer the harrow, means on said tractor frame for limiting the rotation of said steering bar, and means other than said tongue connection for causing said tractor to pull the harrow.

8. A draft connection for attaching an implement to a tractor in such a manner that the implement will follow the tractor in turning without material resistance to that turning, comprising a tongue on the implement, a frame on the tractor extending rearwardly from the driving wheel, a steering rod pivoted to said frame to permit rotation of the rod through a horizontal plane, said rod having its free end disposed adjacent to one of said driving wheels, a connection between said free end and said tongue, said connection permitting rotation of the tongue about a vertical axis, and serving to steer the implement, stop blocks on said frame for limiting the rotation of said steering bar and means other than said tongue connection for causing said tractor to pull said implement.

9. A draft connection for attaching a disk harrow to a tractor in such a manner that the harrow will follow the tractor in turning without material resistance to that turning, comprising a tongue on the harrow, a steering bar on the tractor and capable of motion fore and aft thereof to which said tongue is attached to steer the harrow, a cross frame on said tractor, a draw bar supported on said cross frame and extending from a pivot point located near the front end of the tractor rearwardly to a point adjacent to said steering bar, and a connecting bar connecting the rearward end of said draw bar to a point on said harrow back of said tongue connection.

10. A connection for attaching a disk harrow to a tractor comprising a bracket extending rearwardly from the driving wheels of the tractor, a U-shaped bracket mounted on said first bracket, a Z-shaped steering rod having a horizontal portion pivoted in said U-bracket, a vertical portion projecting downward therefrom and a second horizontal portion to which the steering tongue of the disk harrow is attached, and a draw bar pivoted to said tractor ahead of its driving wheels and connected to said disk harrow at a point to the rear of said steering connection to thereby draw the harrow in the tracks of the tractor during turning without resistance to that turning.

11. A draft connection for attaching a disk harrow having an axle to a tractor so that the harrow will accurately follow the tractor in turning without resisting that turning, comprising a tongue on the harrow projecting upward and forward from the axle of the harrow, a steering bar pivoted to the tractor and connected to said tongue, and a draft bar pivoted to said tractor at a point ahead of and beneath said steering bar and extending rearwardly from that pivot and beneath said tongue to a point on said harrow adjacent said axle, said steering bar being capable of limited motion fore and aft of the tractor.

12. A draft connection for attaching a disk harrow having an axle to a tractor so that the harrow will accurately follow the tractor in turning without resisting that turning, comprising a tongue on the harrow projecting upward and forward from the axle of the harrow, a steering bar pivoted to the tractor and connected to said tongue, and a draft bar pivoted to said tractor at a point ahead of and beneath said steering bar and extending to the rear in a substantially straight line from that pivot and beneath said tongue to a point on said harrow adjacent said axle.

13. A connection for attaching a disk harrow having an axle to a tractor so that the harrow will accurately follow the tractor in turning without resisting that turning, comprising a tongue on the harrow projecting upward and forward from the axle of the harrow, a steering bar pivoted to the tractor for fore and aft motion relative thereto and connected to said tongue, and a draft bar pivoted to said tractor at a point ahead of and beneath said steering bar and extending to the rear in substantially a horizontal plane from that pivot and beneath said tongue to a point on said harrow adjacent to said axle.

14. In combination with a disk harrow having a V-shaped tongue extending forward and terminating in a connecting block, of a tractor having a frame extending rearward of the driving wheels, a steering crank attached to said frame work and connected to said connecting block, and a draft bar pivoted to said tractor ahead of the driving wheels and to said harrow tongue to the rear of said connecting block and near the harrow, said steering crank being capable of limited fore and aft motion relative to the tractor.

15. In combination with a disk harrow having a V-shaped tongue extending forward and terminating in a connecting block, of a tractor having a frame work extending rearward of the driving wheels, a steering crank attached to said frame work and connected to said connecting block, a draft bar support attached to said frame work, a draft bar pivoted to said tractor ahead of the driving wheels and extending rearward therefrom to the approximate plane of said steering crank, and a draft chain connecting said bar to a point on said harrow tongue adjacent to said harrow.

16. In combination with a disk harrow having a V-shaped tongue extending forward and terminating in a connecting block, of a tractor having a frame work extending rearward of the driving wheel, a U-shaped bracket attached to said frame work, a steering crank pivoted in said bracket and free to rotate therein about a horizontal axis and connected to said connecting block by a bearing provided for rotation about both a vertical and a horizontal axis, and a draft bar pivoted to said tractor ahead of the driving wheels and to said harrow tongue to the rear of said connecting block and near the harrow.

17. A draft connection for attaching an implement to a tractor in such a manner that the implement will follow the tractor during turning without resistance to that turning, comprising a tongue on the implement, means on the tractor for attaching the free end of the tongue thereto, said connecting means being capable of limited motion fore and aft of said tractor, and a draw-bar attached to said tractor ahead of said connection and connected to said tongue at a point to the rear of said connection.

18. A draft connection for attaching an implement to a tractor in such a manner that the implement will follow the tractor during turning without resistance to that turning, comprising a tongue on the implement, and means for attaching said tongue to the tractor at a point to the rear of the traction wheels, said attaching means being capable of a limited fore and aft movement with respect to the tractor, and a draw bar, attached to the tractor ahead of the traction wheels and to the tongue to the rear of said connection, for pulling the implement.

19. A draft connection for attaching an implement to a tractor in such a manner that the implement will follow the tractor during turning without resistance to that turning, comprising a tongue on the implement, and means for attaching said tongue to the tractor at a point to the rear of the traction wheels, said means permitting a limited fore and aft movement of the tongue with respect to the tractor, and resisting movement of the tongue laterally with respect to the tractor, and a draw bar attached to the tractor ahead of the traction wheels and to the tongue to the rear of said connection for pulling the implement, said attaching means being capable of limited fore and aft movement relative to the tractor.

20. A draft connection for attaching an implement to a tractor, comprising the combination of a steering hitch made to the rear and under the axis of the traction wheels by a connection which is capable of limited movement fore and aft on the tractor, with a pulling hitch made ahead of the traction wheels of the tractor.

21. A draft connection for attaching an implement to a tractor, comprising, the combination of a steering connection made to the rear of the traction wheels and which connection is capable of limited movement fore and aft of the tractor and incapable of lateral movement with respect to the tractor, with a pulling connection made ahead of the traction wheels of the tractor, which pulling connection is capable of lateral movement with respect to the tractor and incapable of fore and aft movement with respect thereto.

22. A draft connection for attaching an implement to a tractor, comprising, the combination of a steering connection made to the rear of the traction wheels and which connection is capable of limited movement fore and aft of the tractor and incapable of lateral movement with respect to the tractor, with a pulling connection made ahead of the traction wheels of the tractor, which pulling connection is capable of lateral movement with respect to the tractor and incapable of fore and aft movement with respect thereto, and means for permitting vertical movement of the tractor with respect to the implement.

23. A draft connection for attaching an implement to a tractor, comprising, the combination of a steering connection made to the rear of the traction wheels and which connection is capable of limited movement fore and aft of the tractor and incapable of lateral movement with respect to the tractor, with a pulling connection made ahead of the traction wheels of the tractor, which pulling connection is capable of lateral movement with respect to the tractor and incapable of fore and aft movement with respect thereto, and means in said connections for permitting them to flex vertically to thereby permit said tractor to be moved vertically with respect to the implement.

24. A draft connection for attaching an implement to a tractor in offset position comprising a steering rod mounted on the tractor to the rear of the tractor wheels and adjustable laterally thereon to determine the amount of offset, said rod being movable fore and aft of the tractor through a limited distance, and a draw bar connection pivoted to the tractor ahead of the traction wheels to pull the implement.

25. A draft connection for attaching an implement to a tractor in offset position comprising a framework on said tractor projecting to the rear of the traction wheels and having a plurality of holes, a steering bar having an offset connecting portion and a pivot portion, said pivot portion fitting into any one of said holes, the particular hole in which the pivot portion is fitted determining the amount of the offset of said connection, and a draw bar connection pivoted to the tractor ahead of the traction wheels to pull the implement.

In witness whereof, I hereunto subscribe my name this 17th day of July, 1929.

WILLIAM L. PAUL.